United States Patent [19]

Miller

[11] 4,129,786

[45] Dec. 12, 1978

[54] RIM-TYPE HYDROELECTRIC MACHINE

[75] Inventor: Helmut Miller, Niederrohrdorf, Switzerland

[73] Assignee: Escher Wyss Limited, Zurich, Switzerland

[21] Appl. No.: 744,250

[22] Filed: Nov. 23, 1976

[30] Foreign Application Priority Data

Dec. 2, 1975 [CH] Switzerland .................. 15611/75

[51] Int. Cl.² .................... F01D 15/10; F01D 7/00
[52] U.S. Cl. ........................... 290/52; 415/136; 415/130
[58] Field of Search ............... 308/72; 290/52; 415/122 A, 129-140

[56] References Cited

U.S. PATENT DOCUMENTS 3,779,619  12/1973  Van Dorn ..................... 308/72

FOREIGN PATENT DOCUMENTS 181838   9/1954  Austria ......................... 415/130
1049320  1/1959  Fed. Rep. of Germany ........... 290/52
327693   2/1935  Italy ........................... 308/72
347253   6/1969  Switzerland ..................... 290/52

Primary Examiner—Robert K. Schaefer
Assistant Examiner—John W. Redman
Attorney, Agent, or Firm—Robert A. Ostmann

[57] ABSTRACT

The disclosure concerns a hydroelectric machine set in which the electrical machine is in the form of a rim which surrounds a service water duct containing the bladed wheel of a hydraulic machine, and wherein the blades of said wheel are joined to the rotor of the electrical machine by torque-transmitting connections which allow free radial movement of the blades relatively to the rotor. Preferably, those connections also permit pivoting movement of the blades relatively to the rotor.

5 Claims, 3 Drawing Figures

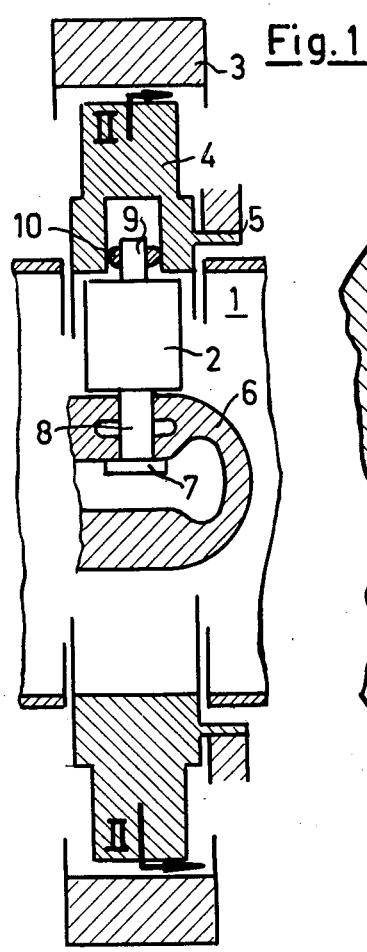
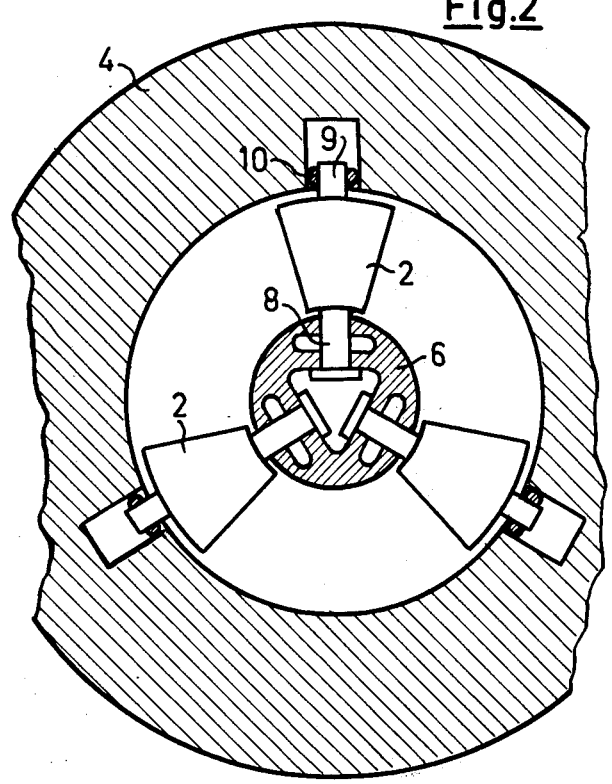
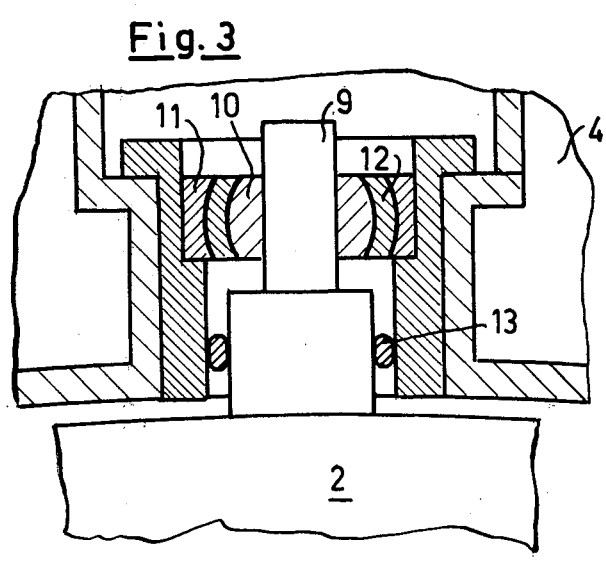

RIM-TYPE HYDROELECTRIC MACHINE

BACKGROUND AND SUMMARY OF THE INVENTION

The invention relates to a hydroelectric machine set including an electrical machine which surrounds a service water duct and the bladed wheel of a hydraulic machine in the form of a rim, and whose rotor is connected to the external ends of the blades of said bladed wheel.

Known machine sets of this kind comprise a hydraulic machine having three or more blades. If the blades are not adjustable (i.e., capable of turning about their longitudinal axes), they are fixed to the rotor of the electrical machine, so that the rotor and bladed wheel support each other in the most stable manner possible. On the other hand, if the blades are adjustable, then either the rotor is connected with the hub of the bladed wheel by ties which extend through the blades along their axes of rotation, or the external ends of the blades are mounted in the rotor by thrust bearings which take up the radial forces which occur between the rotor and hub. The rotating bodies of these known machine sets are subjected to considerable deformation because of the centrifugal forces which act on the various component parts.

The object of this invention is to provide a hydroelectric machine set wherein deformation of the kind mentioned does not occur, yet torque is transmitted between the bladed wheel of the hydraulic machine and the rotor of the electrical machine as required, and the bladed wheel and the rotor are maintained centered relatively to one another. According to the invention, this object is achieved by using torque-transmitting connections between the blades and the rotor which allow the blades to move freely in the radial direction relatively to the rotor. Preferably, these connections also permit the blades to pivot with respect to the rotor.

The invention is based on the new realization that the three or more blades are anchored securely, although possibly adjustably mounted, in the bladed wheel hub center the rotor with respect to the bladed wheel in a satisfactory manner if the regions of the rim-shaped rotor ajoining the external blade ends just remain on the respective blade axes. Since, when transmitting torque, all blades bend uniformly, bending of the blades under torque does not prejudice the satisfactory centering effect just mentioned. Moreover, the pivoting freedom afforded by the blade-rotor connections keeps the rotor free of blade bending forces.

With particular advantage, the rotor of the improved machine set is mounted on the foundation of the set by means of a radial bearing arrangement situated outside the service water duct.

BRIEF DESCRIPTION OF THE DRAWING

A preferred embodiment of the invention is described herein in detail with reference to the accompanying drawing, which contains simplified schematic illustrations, and in which:

FIG. 1 is a vertical axial sectional view through the electrical machine and the bladed wheel of the hydraulic machine of an improved hydroelectric machine set.

FIG. 2 is a sectional view taken on line II—II of FIG. 1.

FIG. 3 is an enlarged view of one of the blade connections shown in FIG. 2.

DESCRIPTION OF ILLUSTRATED EMBODIMENT

The hydroelectric machine set illustrated comprises a service water duct 1, a bladed wheel 2 of a hydraulic machine and a stator 3 of an electrical machine. A rotor 4 of the electrical machine is mounted on the foundation by means of a radial bearing arrangement 5 situated outside the service water duct 1.

The blades 2 are mounted to be turnable (i.e., adjustable) in a hub 6 of the hydraulic machine. A flange 7 of the internal bearing pin or neck 8 of each blade 2 holds the blade so as to be non-displaceable in the radial direction in hub 6. At their external ends, blades 2 are mounted in rotor 4 by torque-transmitting connections which allow them to pivot and move radially relatively to the rotor.

As shown in FIG. 3, each torque-transmitting connection comprises a pin 9 on the external end of blade 2 which engages in a ball element 10 received in and guided by a socket 11 mounted in rotor 4. The ball element 10 can pivot relatively to the socket 11, and the pin 9 of the blade can move radially with respect to ball element 10. In an alternative construction, ball element 10 is fixed to pin 9, and socket 11 is mounted for radial movement in rotor 4. Between ball element 10 and socket 11 there is arranged a sliding layer 12, which consists of a solid substance which can accept high pressures (i.e., has high compressive strength), but has only low shear strength. A rubber ring 13, which is interposed between duct 1 and connection 9–12, seals the bearing parts from the service water.

I claim:

1. In a hydroelectric machine set which includes a service water duct, a hydraulic machine having a wheel within the duct which carries radially extending blades, and an electrical machine which surrounds the duct and the bladed wheel in the manner of a rim and has a rotor, the improvement which comprises torque-transmitting connections between the external ends of the blades and the rotor which allow free radial movement and also pivotal movement of the blades relatively to the rotor.

2. A machine set as defined in claim 1 in which each of said connections comprises a pin extending radially from the external end of the blade; a ball element surrounding the pin; and a socket mounted in the rotor and formed to receive and guide the ball element.

3. A machine set as defined in claim 2 in which the pin is movable radially relatively to the ball; and the socket is fixed against radial movement with respect to the rotor.

4. A machine set as defined in claim 2 in which each of said connections includes a sliding layer which is interposed between the ball and socket and is made of a solid material having high compressive strength and low shear strength.

5. A machine set as defined in claim 1 which includes radial bearing apparatus for supporting the rotor which is situated outside the duct.

* * * * *